May 20, 1958  A. DIVENDAL  2,835,790
LIGHTING FITTING ADAPTED FOR SUSPENSION
Filed Aug. 11, 1954  2 Sheets-Sheet 1

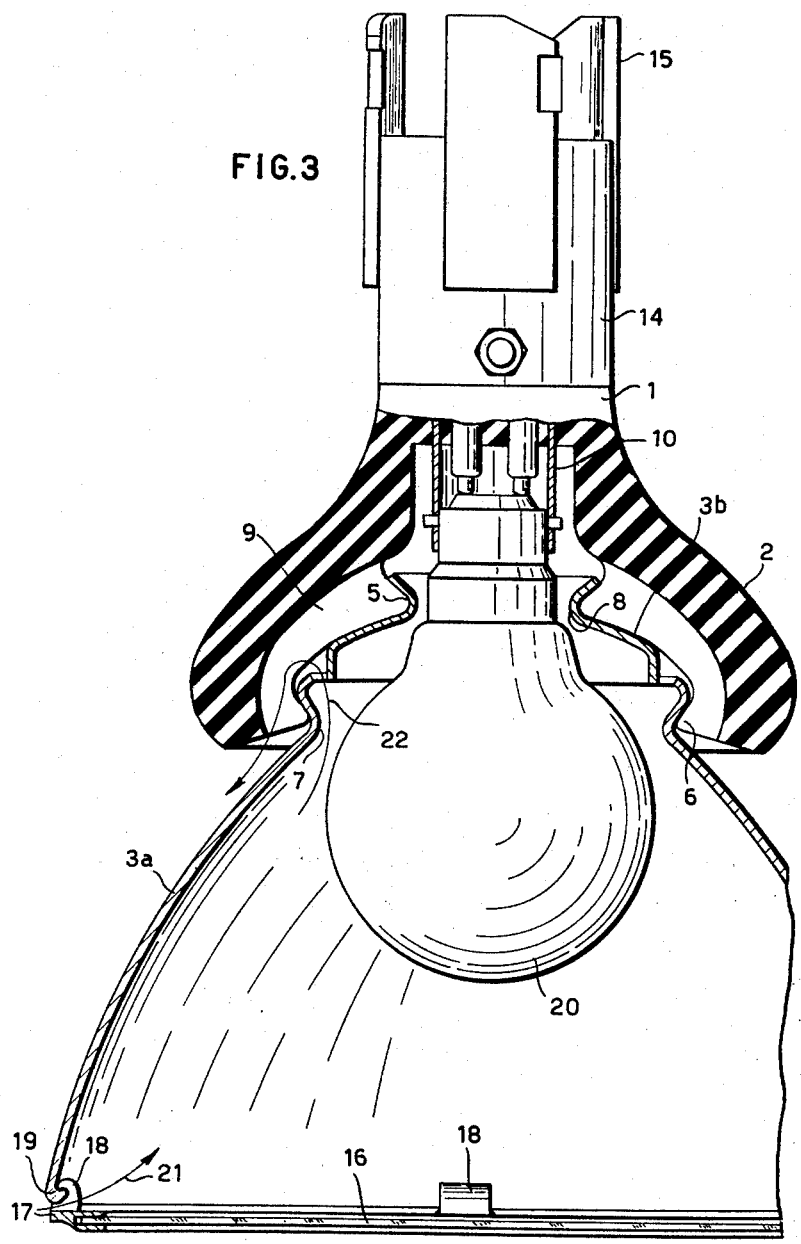

United States Patent Office 2,835,790
Patented May 20, 1958

2,835,790

LIGHTING FITTING ADAPTED FOR SUSPENSION

Albertus Divendal, Amsterdam, Netherlands, assignor to N. V. Hollandsche Draad- en Kabelfabriek, Amsterdam, Netherlands, a limited-liability company of the Netherlands Application August 11, 1954, Serial No. 449,234

Claims priority, application Netherlands March 25, 1954

4 Claims. (Cl. 240—46.59)

The invention relates to a substantially closed lighting fitting adapted for suspension having a source of light of relatively great power, which fitting is provided with a ventilation device. With substantially closed lighting fittings of the above-mentioned type often difficulties are encountered to meet at the same time the requirements that a sufficient elimination of heat from the source of light of great power is obtained and that radiation of light in an undesirable direction is prevented.

It is an object of the invention to provide a lighting fitting of the abovementioned type in which the said disadvantages are eliminated and which is also suitable to be used outdoors.

According to the invention a substantially closed lighting fitting adapted for suspension is formed by an upper part, a reflector and a transparent window, a source of light arranged within the said fitting, apertures for the admission of air being arranged in the lower portion of the said fitting and apertures for exhausting heated air being arranged in the upper portion of the said fitting in such a manner that the said air leaves the fitting laterally in a downward direction.

According to the invention a substantially closed lighting fitting adapted for suspension may be formed by a central upper part constructed as a socket for an electric source of light, a reflector extending downwardly around said source of light and being held in the lower portion of said central upper part of the fitting, and by a transparent window arranged near the lower rim of the reflector leaving a gap for the admission of air, and apertures for exhausting heated air in the upper portion of the said fitting, in such a manner that the said air leaves the fitting laterally in a downward direction. The reflector may thereby consist of two coaxial parts both held in the central upper part of the fitting in such a manner that a ring-shaped air exhaust aperture located within the said lower portion is provided between the facing rims of the parts of the reflector.

According to another feature of the invention a substantially closed lighting fitting adapted for suspension may be formed by a central upper part constructed as a socket for an electric source of light, having an enlarged lower portion consisting of rubber or similar elastic material provided at its inner surface with two coaxial ring-shaped rims, a reflector, consisting of two coaxial parts both held in said enlarged lower portion by the cooperation of said coaxial ring-shaped rims with a corresponding complementary formed rim on each part of the reflector, extending downwardly around said source of light, a ring-shaped air exhaust aperture located within the said enlarged lower portion being provided between the facing rims of the parts of the reflector, the said inner surface being further provided with substantially radially disposed recesses extending in the said surface in the direction towards the outer rim beyond the said ring-shaped rims and by a transparent window arranged near the lower rim of the reflector leaving a gap for the admission of air. By this construction it is not only attained that both parts of the reflector are firmly held in the said enlarged lower portion without the aid of separate attaching means, such as screws and the like, and may nevertheless easily be removed, but at the same time that a good ventilation of the inner space of the lighting fitting is assured without radiation of light near the upper part of the said fitting.

Lighting fittings adapted for suspension having a central upper part of rubber or elastic material lend themselves very well to application in such spaces in which they may be subject to a rough manipulation, e. g. for military purposes, for illuminating shelters etc. In order to prevent with the lastnamed application that on quickly leaving illuminated shelters at night "night-blindness" occurs according to the invention the window may consist of a red light filter. The window may furthermore be in the form of a flat circular disc mounted in a ring-shaped hollow rim of rubber or similar elastic material of U-shaped cross-section, on which rim locking lugs are formed cooperating with the flanged lower rim of the reflector.

The invention will now be explained in detail with reference to the accompanying drawings in which an embodiment of a lighting fitting according to the invention is illustrated.

Figure 3 shows finally the completely mounted lighting fitting in axial section with partial elevation.

Figure 2:
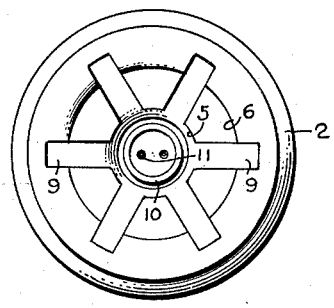
Figure 2 shows the bottom view on the enlarged lower portion of the part illustrated in Fig. 1.
Figure 1:
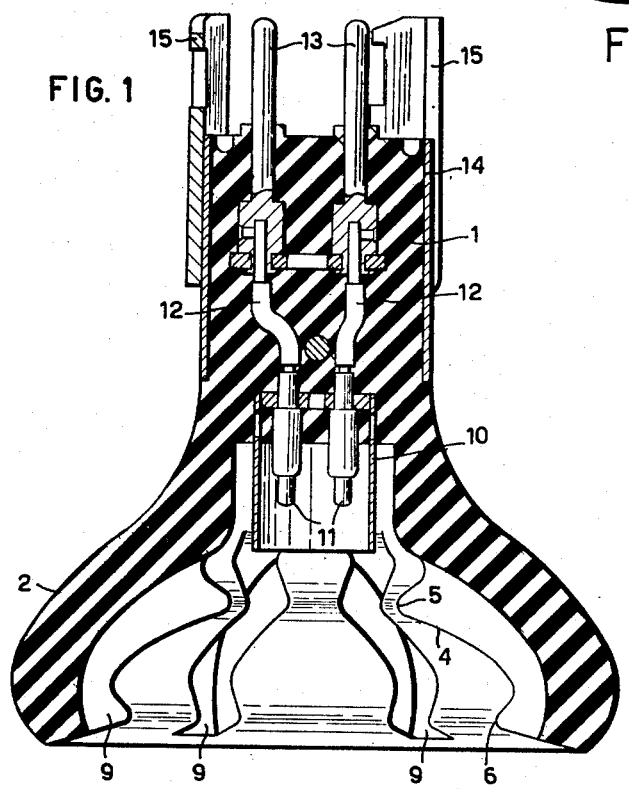
Figure 1 shows in axial section the central upper part of the lighting fitting constructed as a lamp socket.

As appears from the figures the illustrated lighting fitting has a central upper part 1 of rubber or similar elastic material, which upper part merges in downward direction into an enlarged lower portion 2 adapted for holding a reflector substantially consisting of a ring-shaped parabolic screen 3a protruding for the greater part below the lower portion 2, and of a smaller ring-shaped screen 3b located entirely within the enlarged lower portion 2. For holding the screens 3a and 3b two ring-shaped rims 5 and 6 are formed on the inner surface 4 of the enlarged lower portion 2. The ring-shaped screen 3a has near its upper rim a ring-shaped stamped rim 7 in which the rim 6 formed on the enlarged lower portion engages in order to hold the said screen. The screen 3b is held in like manner in that the said rim 5 of the enlarged lower portion 2 engages a ring-shaped stamped rim 8 arranged at the upper rim of the lastmentioned screen. With the said manner of arranging the screens 3a and 3b the same may easily be applied and removed without the need of using tools.

The lower rim of the ring-shaped screen 3b has a smaller diameter than the upper rim of the screen 3a so that a ring-shaped gap is provided between the lastnamed rims, by which air circulation may occur.

Furthermore six radially directed recesses 9 are provided in the inner surface 4 of the enlarged lower portion 2, each recess extending in opposite directions beyond the rims 5 and 6.

The central upper part 1 of the lighting fitting is at the same time arranged as a lamp socket which in this embodiment is constructed as a lamp socket with bayonet joint, while the said upper part is arranged at its upper end as the plug of a plug and socket.

The said lamp socket consists of a metal sleeve 10 within which parallel contact members 11 adapted to be resilient in axial direction are arranged, connected by means of insulated conductors 12 with plug-pins 13 protruding from the upper end of the upper part 1 of the lighting fitting. The end of the upper part 1 constructed as a plug is furthermore provided with a metal sleeve 14 with welded hook-shaped cams 15 serving both for interlocking both parts of the plug and socket and for the mechanical protection of the plug-pins 13.

The open lower end of the ring-shaped screen 3a is closed by a window leaving a ring-shaped aperture, the said window consisting of a circular disc 16 of unbreakable artificial substance. If the lighting fitting is destined for shelters the said disc is coloured in such a manner that only red rays having a predetermined wavelength are passed. The circular disc 16 is mounted in a ring-shaped hollow rim 17 of U-shaped cross-section, of rubber or similar elastic material, on which rim hook-shaped lugs 18 are formed on one side, adapted to engage the inwardly flanged lower rim 19 of the ring-shaped screen 3a. The lugs 18 are of such height that a ring-shaped gap is left between the rims 17 and 19 for air circulation. By the said construction the window may easily be applied and removed without the need of using tools. In the above described lighting fitting an electric lamp 20 of relatively great power and great light intensity is applied, as of course a part of the light radiated by the said lamp is absorbed by the red light filter. As otherwise the described lighting fitting has to be used e. g. in military shelters and other spaces having mostly limited dimensions the dimensions of the whole fitting should also be as small as possible. This involves, however, that provision must be made for a good ventilation of the developed heat. By the presence of the ring-shaped aperture between the rims 17 and 19 on the lower side of the lighting fitting and the ring-shaped aperture between the facing rims of the screens 3a and 3b in the upper part of the fitting a natural ventilation is obtained due to rising of hot air in the inner space, as is indicated by the arrows 21 and 22 in Fig. 3.

It will be clear that the constructive embodiment of the lighting fitting described above may be altered in many respects without departing from the scope of the invention.

I claim:

1. A substantially closed lighting fitting comprising a central upper part constructed as a socket for an electric source of light and having an enlarged lower portion consisting of a resilient material provided at its inner surface with two coaxial ring-shaped rims, a reflector consisting of two coaxial parts with rims, both of said parts being held in said enlarged lower portion by the cooperation of said coaxial ring-shaped rims with the rims on the parts of the reflector, said reflector extending downwardly around said source of light, said coaxial parts defining a ring-shaped air exhaust aperture located within the said enlarged lower portion, the said inner surface being further provided with substantially radially disposed recesses extending in the said surface in opposite directions beyond the said ring-shaped rims and a transparent window spaced from the bottom of the reflector and defining a gap therewith for the admission of air.

2. A substantially closed lighting fitting comprising a central upper part constructed as a socket for an electric source of light and having an enlarged lower portion consisting of a resilient material provided at its inner surface with two coaxial ring-shaped rims, a reflector consisting of two coaxial parts with rims, both of said parts being held in said enlarged lower portion by the cooperation of said coaxial ring-shaped rims with the rims on the parts of the reflector, said reflector extending downwardly around said source of light, said coaxial parts defining a ring-shaped air exhaust aperture located within the said enlarged lower portion, the said inner surface being further provided with substantially radially disposed recesses extending in the said surface in opposite directions beyond the said ring-shaped rims, and a window having a red light filter spaced from the bottom of the reflector and defining a gap therewith for the admission of air.

3. A substantially closed lighting fitting comprising a central upper part constructed as a socket for an electric source of light and having an enlarged lower portion consisting of a resilient material provided at its inner surface with two coaxial ring-shaped rims, a reflector consisting of two coaxial parts with rims, both of said parts being held in said enlarged lower portion by the cooperation of said coaxial ring-shaped rims with the rims on the parts of the reflector, said reflector extending downwardly around said source of light, said coaxial parts defining a ring-shaped air exhaust aperture located within the said enlarged lower portion, the said inner surface being further provided with substantially radially disposed recesses extending in the said surface in opposite directions beyond the said ring-shaped rims, a window having a red light filter in the form of a flat circular disc, a ring-shaped hollow rim of resilient material of U-shaped cross-section supporting said window, and rim locking lugs on said hollow rim for supporting the hollow rim on the reflector.

4. A substantially closed lighting fitting comprising a central upper part constructed as a socket for an electric source of light and having an enlarged lower portion consisting of a resilient material provided at its inner surface with two coaxial ring-shaped rims, said central upper part being constructed at its upper end as a part of a plug and socket, a reflector consisting of two coaxial parts with rims, both of said parts being held in said enlarged lower portion by the cooperation of said coaxial ring-shaped rims with the rims on the parts of the reflector, said reflector extending downwardly around said source of light, said coaxial parts defining a ring-shaped air exhaust aperture located within the said enlarged lower portion, the said inner surface being further provided with substantially radially disposed recesses extending in the said surface in opposite directions beyond the said ring-shaped rims, a red light filter in the form of a flat circular disc, a ring-shaped hollow rim supporting said filter, and rim locking lugs coupling said hollow rim to the reflector.

References Cited in the file of this patent
UNITED STATES PATENTS

| | | |
|---|---|---|
| 1,210,673 | Mould | Jan. 2, 1917 |
| 1,464,699 | Dunlap | Aug. 14, 1923 |
| 1,729,647 | Clifford | Oct. 1, 1929 |
| 2,016,474 | Wood | Oct. 8, 1935 |